United States Patent
Morizumi

(10) Patent No.: US 9,205,668 B2
(45) Date of Patent: Dec. 8, 2015

(54) IMAGE FORMING APPARATUS, AND CONTROL PROGRAM AND OPERATION METHOD THEREOF

(71) Applicants: KABUSHIKI KAISHA TOSHIBA, Tokyo (JP); TOSHIBA TEC KABUSHIKI KAISHA, Tokyo (JP)

(72) Inventor: Kenta Morizumi, Fuji Shizuoka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/476,397

(22) Filed: Sep. 3, 2014

(65) Prior Publication Data

US 2015/0306886 A1  Oct. 29, 2015

(30) Foreign Application Priority Data

Apr. 24, 2014  (JP) .................................. 2014-090570

(51) Int. Cl.
*B41J 2/325* (2006.01)
*B41J 2/32* (2006.01)
*B41J 29/38* (2006.01)

(52) U.S. Cl.
CPC ... *B41J 2/32* (2013.01); *B41J 29/38* (2013.01)

(58) Field of Classification Search
USPC ............................ 347/171, 179; 399/167, 328
See application file for complete search history.

(56) References Cited

U.S. PATENT DOCUMENTS

| | | | | |
|---|---|---|---|---|
| 7,324,237 | B2 * | 1/2008 | Okada ........................... | 347/179 |
| 2010/0315475 | A1 * | 12/2010 | Taki et al. ..................... | 347/179 |
| 2012/0038732 | A1 * | 2/2012 | Iguchi et al. .................. | 347/179 |
| 2012/0325101 | A1 | 12/2012 | Tanaka et al. | |

OTHER PUBLICATIONS

U.S. Appl. No. 14/145,793, filed Dec. 31, 2013; Inventors: Kenta Morizumi and Fumiharu Nakayama.

* cited by examiner

*Primary Examiner* — Kristal Feggins
(74) *Attorney, Agent, or Firm* — Patterson & Sheridan, LLP

(57) ABSTRACT

An image forming apparatus includes a decoloring unit for performing decoloring processing on a sheet. An image forming unit forms an image on a sheet using decolorable material. A reuse tray receives a sheet provided by a user. A processor determines whether a sheet is provided on the reuse tray. When it is determined that a sheet is provided on the reuse tray, the decoloring unit performs the decoloring processing on the sheet. The processor determines whether the sheet meets a predetermined usability condition. When it is determined that the sheet meets the predetermined condition, the image forming unit forms an image on the sheet. When the image forming unit forms an image on the sheet that is determined to meet the predetermined condition, the processor updates a rewards account of the user.

20 Claims, 3 Drawing Sheets

IMAGE FORMING APPARATUS, AND CONTROL PROGRAM AND OPERATION METHOD THEREOF

CROSS-REFERENCE TO RELATED APPLICATION

This application is based upon and claims the benefit of priority from Japanese Patent Application No. 2014-090570, filed Apr. 24, 2014, the entire contents of which are incorporated herein by reference.

FIELD

Embodiments described herein relate generally to an image forming apparatus, and a control program and an operation method thereof.

BACKGROUND

Technology exists in which a recording medium (such as paper) may be reused by forming an image on the recording medium using a developer which may be later erased by decoloring the image. Such technology has value because, for example, it is possible to reduce paper expenses when an image forming apparatus utilizing such a technology is adopted and used. In other words, there is a clear motivation to reuse a medium on which an image has been decolored.

However, when the image forming apparatus is provided in a supermarket, a convenience store, or the like, and is used by a customer, there is a concern that there may be little motivation for a customer to reuse a recording medium by decoloring the image formed thereon. As a result, there is a concern that the function of decoloring the image may not always be effectively used.

It is desirable to motivate a user to utilize a function of decoloring the image.

DETAILED DESCRIPTION

Embodiments provide an image forming apparatus which may motivate a user to reuse a recording medium by decoloring an image formed thereon, when the user may not otherwise enjoy the value of decoloring the image, and a control program and an operation method thereof.

An image forming apparatus according to an embodiment includes a decoloring unit for performing decoloring processing on a sheet. An image forming unit forms an image on a sheet using decolorable material. A reuse tray receives a sheet provided by a user. A processor determines whether a sheet is provided on the reuse tray. When it is determined that a sheet is provided on the reuse tray, the decoloring unit performs the decoloring processing on the sheet. The processor determines whether the sheet meets a predetermined usability condition. When it is determined that the sheet meets the predetermined condition, the image forming unit forms an image on the sheet. When the image forming unit forms an image on the sheet that is determined to meet the predetermined condition, the processor updates a rewards account of the user.

An example of the following embodiment will be described in connection with the drawings. In addition, a multifunction printer which has a function of an image forming apparatus will be described as an example in the embodiment. In addition, here, the multifunction printer in the embodiment includes a printer which is provided in a store such as a supermarket or a convenience store, is managed by an employee of the store, and is used by a customer. That is, the employee is an example of a manager, and the customer is an example of a user. In addition, there is a possibility that an operation may be performed by an employee on the customer's behalf. However, it is assumed that the employee is the customer in such a case.

Figure 1:
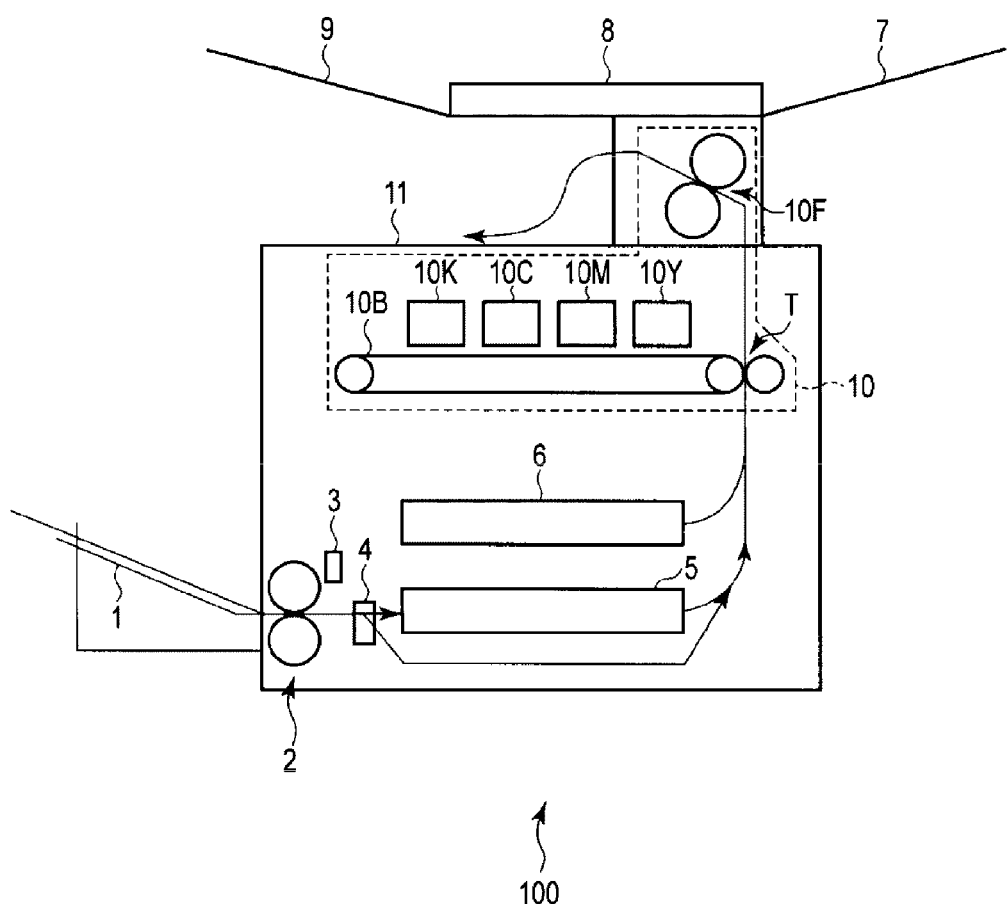
FIG. 1 is a diagram which schematically illustrates a mechanical structure of a multifunction printer according to an embodiment.

FIG. 1 is a diagram which schematically illustrates a mechanical structure of a multifunction printer 100 according to the embodiment.

The multifunction printer 100 includes a reuse sheet tray 1, decoloring unit 2, a scanner 3, a distribution unit 4, a reservation tray 5, a new sheet tray 6, an original document tray 7, a scanner 8, a sheet discharging tray 9, an image forming unit 10, and a sheet discharging tray 11.

The reuse sheet tray 1 is a tray for setting a recording medium for image forming which is brought in by a user. The recording medium is typically paper, and has a sheet shape. The recording medium may be formed of any suitable material except for resin paper. Hereinafter, a recording medium which is set in the reuse sheet tray 1 is referred to as a reuse sheet. It is also possible to set a new sheet in the reuse sheet tray 1, however, according to the embodiment, it is assumed that all of sheets which are set in the reuse sheet tray 1 are reuse sheets.

The decoloring unit 2 performs decoloring processing with respect to a reuse sheet. For example, according to the embodiment, it is assumed that an image which is formed on the reuse sheet was formed using toner which is decolorable using heat. Thus, the image formed on the sheet is decolored by being heated. However, a decoloring method may be a different method which corresponds to a property of a developer which is a target. In addition, a decoloring method may be a different method in which a developer is removed from a reuse sheet, for example.

The scanner 3 obtains image data by reading the reuse sheet after being subjected to the decoloring process in the decoloring unit 2. That is, the scanner 3 is an example of a reading unit.

The distribution unit 4 sends the reuse sheet which has passed through a reading position in the scanner 3 to the reservation tray 5 or to the image forming unit 10.

The reservation tray 5 temporarily reserves the reuse sheet which is sent from the distribution unit 4. The reuse sheet which is reserved in the reservation tray 5 may be sent to the image forming unit 10 using a transportation mechanism (not illustrated).

The new sheet tray 6 is a tray for setting a non-used recording medium. Hereinafter, a recording medium which is set in the new sheet tray is referred to as a new sheet. In addition, it is also possible to set a used sheet in the new sheet tray 6. However, according to the embodiment, it is assumed that sheets which are set in the new sheet tray 6 are all new sheets. A new sheet which is set in the new sheet tray 6 may be sent to the image forming unit 10 using the above-mentioned transportation mechanism.

The original document tray 7 is a tray for setting an original document on which an image which is a copying target is formed.

The scanner 8 reads the image which is formed on the original document, and generates image data corresponding to the image.

The sheet discharging tray 9 receives the original document which is discharged from the scanner 8.

The image forming unit 10 takes in a reuse sheet which is sent from the distribution unit 4 or the reservation tray 5, or a new sheet which is sent from the new sheet tray 6, and forms an image on the reuse sheet or the new sheet, based on the image data obtained by the scanner 8. With respect to the image forming unit 10, it is possible to use any one of various well-known image forming methods such as an electro-photographic method, an ink jet method, a thermo-sensitive method, or a thermal transfer method. According to the embodiment, image forming is performed using the electro-photographic method, using toner which is decolored by the decoloring process in the decoloring unit 2.

Specifically, the image forming unit 10 includes developing units 10K, 10C, 10M, and 10Y, and a transfer belt 10B, a fixing unit 10F, and the like.

The developing units 10K, 10C, 10M, and 10Y include a photosensitive drum, a charging unit, an exposure unit, a developing unit, a transfer unit, a static eliminator, or the like, respectively. The developing units 10K, 10C, 10M, and 10Y form a developer image on the transfer belt 10B using the well-known electro-photographic method. In addition, the developing units 10K, 10C, 10M, and 10Y form developer images of each color on the same area on the transfer belt 10B based on the image data which includes respective color data of black (B), cyan (C), magenta (M), and yellow (Y). In this manner, the developing units 10K, 10C, 10M, and 10Y form a color developer image on the transfer belt 10B. The developer image which is formed on the transfer belt 10B is transferred onto a reuse sheet or a new sheet at a transfer position T. The fixing unit 10F fixes the developer image which is transferred onto the reuse sheet or the new sheet at the transfer position T using heat.

The sheet discharging tray 11 receives the reuse sheet or the new sheet which is discharged from the image forming unit 10.

Figure 2:
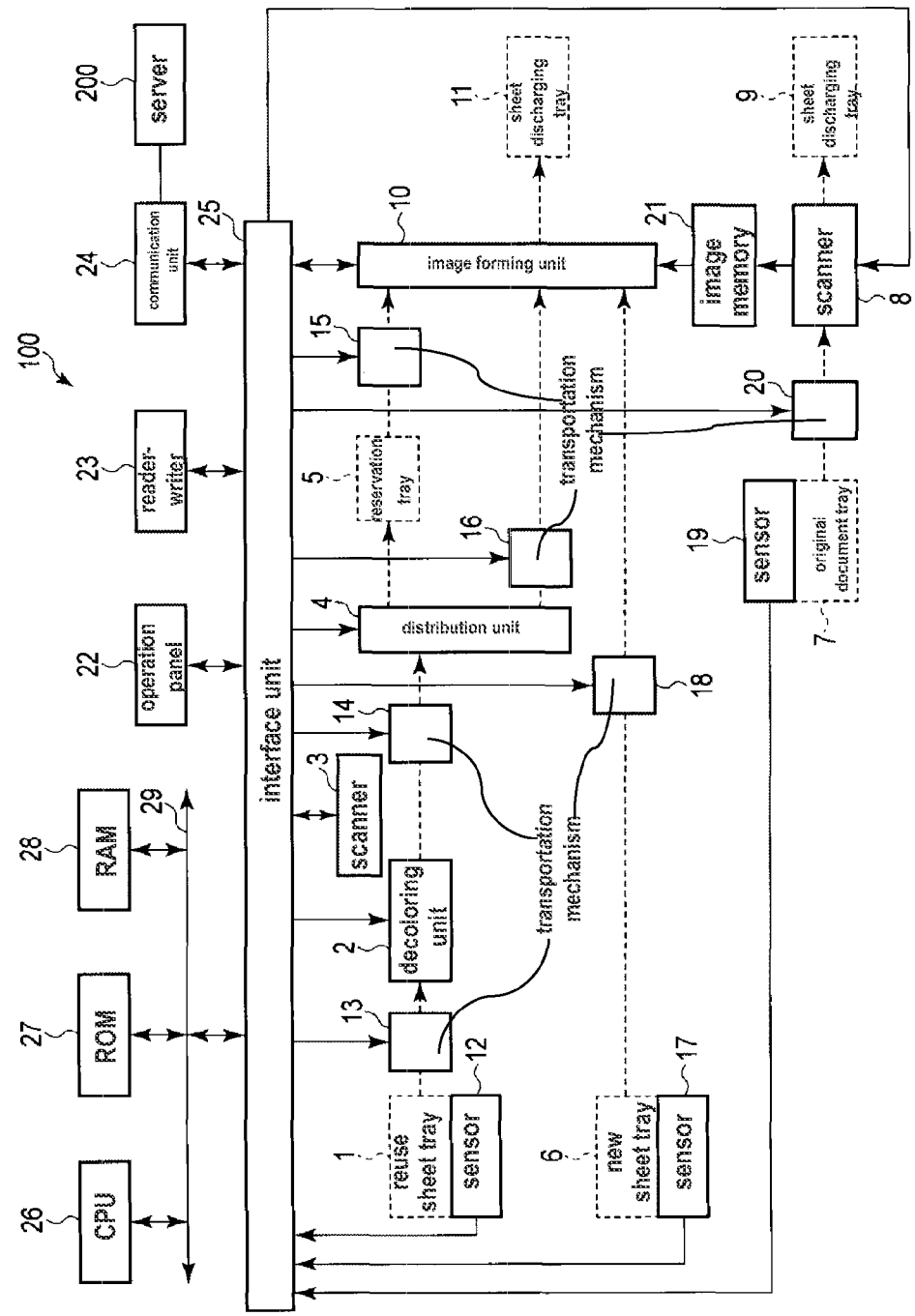
FIG. 2 is a block diagram which illustrates an electrical configuration of the multifunction printer according to the embodiment.

FIG. 2 is a block diagram which illustrates an electrical configuration of the multifunction printer 100. In addition, the elements same as those in FIG. 1 are given the same reference numerals, and detailed descriptions thereof will be omitted.

The multifunction printer 100 includes a sensor 12, transportation mechanism 13-16, a sensor 17, a transportation mechanism 18, a sensor 19, a transportation mechanism 20, an image memory 21, an operation panel 22, a reader-writer 23, a communication unit 24, an interface unit 25, a central processing unit (CPU) 26, a read-only memory (ROM) 27, a random-access memory (RAM) 28, and a system bus 29, in addition to the elements which are illustrated in FIG. 1.

The sensor 12 detects a reuse sheet which is set in the reuse sheet tray 1.

The transportation mechanism 13 transports the reuse sheet which is set in the reuse sheet tray 1 to the decoloring unit 2.

The transportation mechanism 14 transports the reuse sheet that has been subjected to the decoloring process in the decoloring unit 2 to the reservation tray 5 or the transportation mechanism 16 while causing the reuse sheet to pass through the reading position of the scanner 3 and the distribution unit 4.

The transportation mechanism 15 transports the reuse sheet which is held in the reservation tray 5 to the image forming unit 10.

The transportation mechanism 16 transports the reuse sheet which is sent by the transportation mechanism 14 to the image forming unit 10.

The sensor 17 detects a new sheet which is set in the new sheet tray 6.

The transportation mechanism 18 transports the new sheet which is set in the new sheet tray 6 to the image forming unit 10.

The sensor 19 detects the original document which is set in the original document tray 7.

The transportation mechanism 20 transports the original document which is set in the original document tray 7 to the sheet discharging tray 9 while causing the original document to pass through the scanner 8.

Image data which is generated by the scanner 8 is written in the image memory 21 using the scanner 8. The image memory 21 stores the image data at least until the image data is retrieved by the image forming unit 10.

The operation panel 22 includes an input device which accepts input of instructions issued by an operator, and a display device which displays various information for the operator. As the operation panel 22, it is possible to use a touch panel, for example.

In the reader-writer 23, a card which may store data is detachably provided. The reader-writer 23 reads data which is stored on a card, or writes information on the card. As the reader-writer 23, it is possible to use a well-known device which may perform reading and writing of data with respect to a well-known data card such as an IC card, or a magnetic card.

The communication unit 24 communicates with a server 200 through a communication network (not illustrated).

The interface unit 25 provides for exchange of data between and among the decoloring unit 2, the scanner 3, the distribution unit 4, the scanner 8, the image forming unit 10, the sensor 12, the transportation mechanism 13, the transportation mechanism 14, the transportation mechanism 16, the sensor 17, the transportation mechanism 18, the sensor 19, the transportation mechanism 20, the image memory 21, the transportation mechanism 15, the operation panel 22, the reader-writer 23, and the communication unit 24 and the CPU 26. The interface unit 25 includes a plurality of types of interface circuits which are adapted to the decoloring unit 2, the scanner 3, the distribution unit 4, the scanner 8, the image forming unit 10, the sensor 12, the transportation mechanism 13, the transportation mechanism 14, the transportation mechanism 16, the sensor 17, the transportation mechanism 18, the sensor 19, the transportation mechanism 20, the image memory 21, the transportation mechanism 15, the operation panel 22, the reader-writer 23, and the communication unit 24, respectively.

The CPU 26, the ROM 27, the RAM 28, and the system bus 29 may be included in a computer.

The CPU 26 corresponds to a main processing part of the computer. The CPU 26 controls each unit so as to execute various functions of the multifunction printer 100 based on an operating system and an application program which are stored in the ROM 27.

The ROM 27 corresponds to a main storage portion of the computer. The ROM 27 stores the operating system and the application program. In addition, the ROM 27 stores data which is referred to when the CPU 26 performs various processes, in some cases. At least a part of the application program may be stored in an auxiliary storage device such as an electric erasable programmable read-only memory (EEPROM), a hard disk drive, or a solid state drive (SSD) in the multifunction printer 100. In this case, the multifunction printer 100 is transferred in a state in which the application program is stored in the auxiliary storage device. Alternatively, it may be a case in which the multifunction printer 100 is transferred in a state in which the application program is not stored in the auxiliary storage device. In such a case, the application program is transferred by being recorded in a removable recording medium such as a magnetic disc, a magneto-optical disc, an optical disc, and a semiconductor memory, or is transferred through a network, and the application program is written in the auxiliary storage device of the multifunction printer 100 which is separately transferred.

The RAM 28 corresponds to the main storage portion of the computer. The RAM 28 stores data which is referred to when the CPU 26 performs various processes. In addition, the RAM 28 stores data which is temporarily used when the CPU 26 performs various processes, and is used as a so-called work area.

The system bus 29 includes an address bus, a data bus, and the like, and connects the CPU 26, the ROM 27, the RAM 28, and the interface unit 25 so as to exchange data.

For the sensors 12, 17, and 19, it is possible to use a well-known sensor which monitors a reflection state of light which changes in accordance with a presence or absence of a recording medium, or which monitors a position of a mover which is displaced due to the weight of a recording medium, or the like.

For the transportation mechanisms 13, 14, 15, 16, 18, and 20, it is possible to use a well-known mechanism which includes a guide member, a roller, a motor, and the like. These are, for example, mechanisms which convey a recording medium using a roller rotated by a motor, and set a movement path of the recording medium using a guide member.

Subsequently, operations of the multifunction printer 100 which is configured as described above will be described.

When the multifunction printer 100 is in a normal operation state, the CPU 26 starts control processing according to a control program which is one of the application programs which are stored in the ROM 27. In addition, contents of the control processing which will be described below is an example, and it is possible to appropriately use various processes which may obtain the same result.

Figure 3:
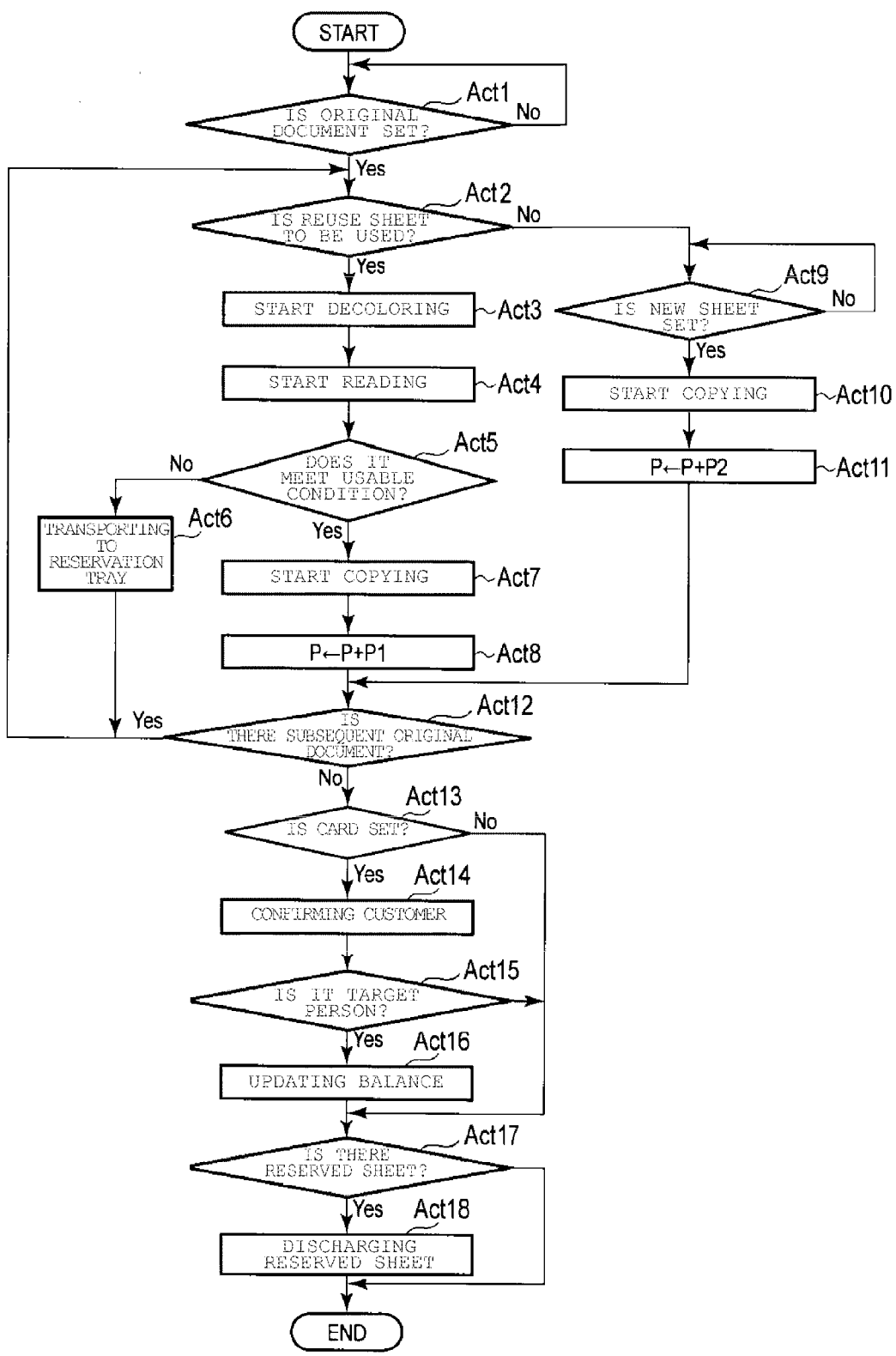
FIG. 3 is a flowchart of an example sequence of operations using a CPU in FIG. 2.

FIG. 3 is a flowchart of an example sequence of operations of the control processing using the CPU 26.

The CPU 26 in Act 1 confirms whether the original document is set in the original document tray 7. Specifically, the CPU 26 confirms whether the original document is detected by the sensor 19. The CPU 26 determines NO when the original document is not detected by the sensor 19, and repeats Act 1. In this manner, the CPU 26 waits for the original document to be set in the original document tray 7 in Act 1.

When a customer wants to copy the original document using the multifunction printer 100, the customer sets the original document which is a copying target in the original document tray 7. At this time, if the customer is a member of a point service, the customer presents his ID card to the reader-writer 23. In addition, when the original document is detected by the sensor 19 when being set in the original document tray 7, the CPU 26 determines YES in Act 1, and the process proceeds to Act 2.

The CPU 26 confirms whether the customer desires to use a reuse sheet in Act 2. Specifically, the CPU 26 prompts the customer to set a reuse sheet, and causes the operation panel 22 to display an image with a button for the customer to declare his or her intention with respect to using the reuse sheet. In addition, the CPU 26 determines YES according to a detection of the reuse sheet using the sensor 12, before a detection of a touch of the button by the operation panel 22, and the process proceeds to Act 3. In this manner, the CPU 26 functions as a first determination unit by executing the control program.

The CPU 26 starts the decoloring process with respect to the reuse sheet in Act 3. Specifically, the CPU 26 causes one sheet of the reuse sheet which is set in the reuse sheet tray 1 to be transported to the decoloring unit 2 using the transportation mechanism 13, and performs the decoloring process with respect to the reuse sheet using the decoloring unit 2. In this manner, the CPU 26 functions as a first control unit by executing the control program.

The CPU 26 starts reading the reuse sheet in Act 4. Specifically, the CPU 26 transports the reuse sheet which is discharged from the decoloring unit 2 using the transportation mechanism 14, and performs reading of an image which is formed on the reuse sheet using the scanner 3.

The CPU 26 analyzes image data which is output from the scanner 3, and confirms whether the reuse sheet which has been subjected to the decoloring process meets usable conditions in Act 5. As an example, the CPU 26 performs binarization with respect to the image data using a predetermined threshold value, and obtains a rate of black pixels among all of pixels included in the image data. The CPU then determines that the reuse sheet meets the usable conditions if the rate is equal to or smaller than a predetermined reference value, and if not, the CPU determines that the reuse sheet does not meet the usable conditions. In this manner, the CPU 26 functions as a second determination unit by executing the control program. The above described threshold value and the reference value may be arbitrarily set by a designer of the multifunction printer 100. In addition, the above described threshold value and the reference value may be set to values which are desired by an employee or a customer according to the operation in the operation panel 22, or the like, by the CPU 26. In addition, when the CPU 26 determines NO since the reuse sheet does not meet the usable conditions, the process proceeds to Act 6.

The CPU 26 transports the reuse sheet which passed through the reading position of the scanner 3 to the reservation tray 5 in Act 6. Specifically, the CPU 26 causes the distribution unit 4 to select the reservation tray 5, and causes the transportation mechanism 14 to transport the reuse sheet to the reservation tray 5. In addition, the CPU 26 returns to the process in Act 2.

On the other hand, when the CPU 26 determines YES in Act 5, i.e., the reuse sheet which has been subjected to the decoloring process meets the usable conditions, the process proceeds to Act 7.

The CPU 26 starts a process of copying one sheet of the original documents which are set in the original document tray 7 on the reuse sheet which has been subjected to the decoloring process in Act 7. Specifically, the CPU 26 causes the distribution unit 4 to select the transportation mechanism 16, and sends the reuse sheet to the image forming unit 10 using the transportation mechanisms 14 and 16. The CPU 26 sends the one original document which is set in the original document tray 7 to the scanner 8 using the transportation mechanism 20 in parallel to the above described operation, and causes the scanner 8 to read the image which is formed on the original document. The image data which is output from the scanner 8 is stored in the image memory 21. The CPU controls the image forming unit 10 so that an image which corresponds to the image data is formed on the reuse sheet which is sent using the transportation mechanism 16. In this manner, the CPU 26 functions as a second control unit by executing the control program. The reuse sheet which is discharged from the image forming unit 10, that is, the reuse sheet with the image now formed thereon, is discharged to the sheet discharging tray 11. In addition, the original document which passed through the scanner 8 is discharged to the sheet discharging tray 9.

Although it is not illustrated, the CPU 26 sets a variable P to 0 immediately after the start of the control processing. The CPU 26 adds a predetermined point value P1 to a variable P in Act 8 (i.e., after the image is formed in Act 7). The CPU 26 returns to a process in Act 12 thereafter. The point P1 may be an arbitrary value. For example, the point value P1 may be set by an employee according to an operation in the operation panel 22, or the like.

Meanwhile, in Act 2, the CPU 26 determines NO according to a detection of a touch of the button in the operation panel 22 (not according to a detection of the reuse sheet by the sensor 12), and the process proceeds to Act 9.

The CPU 26 confirms whether a new sheet is set in the new sheet tray 6 in Act 9. Specifically, the CPU 26 confirms whether the new sheet is detected using the sensor 17. In this manner, the CPU 26 functions as a third determination unit by executing the control program. The CPU 26 determines NO when the new sheet is not detected by the sensor 17, and the process in Act 9 is repeated. In this manner, in Act 9, the CPU 26 waits for the new sheet to be set in the new sheet tray 6. When it is confirmed that the new sheet is set, the CPU 26 determines YES in Act 9, and the process proceeds to Act 10.

The CPU 26 starts a process of copying images on one sheet of the original documents which are set in the original document tray 7 onto the new sheet in Act 10. Specifically, the CPU 26 sends one new sheet which is set in the new sheet tray 6 to the image forming unit 10 using the transportation mechanism 18. The CPU 26 sends one sheet of original documents which are set in the original document tray 7 to the scanner 8 using the transportation mechanism 20 (similar to the above described operation) and causes the scanner 8 to perform reading of an image which is formed on the original document. Image data which is output from the scanner 8 is stored in the image memory 21, and the image forming unit 10 is controlled so that an image is formed on the new sheet based on the image data. The new sheet which is discharged from the image forming unit 10, that is, the new sheet having the image formed thereon, is discharged to the sheet discharging tray 11.

The CPU 26 adds a predetermined point value P2 to the variable P in Act 11. In addition, the CPU 26 proceeds to a process in Act 12 thereafter. The point P2 may be an arbitrary value. For example, the point value P2 may be set by an employee according to an operation in the operation panel 22, or the like. Usually, the point value P1 is larger than the point value P2. For example, the point value P2 may be "0". As another example, the point value P1 may be set to "2", and the point value P2 may be set to "1."

Meanwhile, after changing the variable P in Act 8 or Act 11, the CPU 26 proceeds to Act 12 in both cases.

The CPU 26 confirms whether a subsequent original document is set in the original document tray 7 in Act 12. The CPU 26 determines YES when the original document is detected by the sensor 19, and the process returns to Act 2. That is, the CPU 26 repeats the same processes as those which are described above in order to copy the subsequent original document. However, if a reuse sheet is detected by the sensor 12 when Act 2 is executed again, the CPU 26 may determine YES in Act 2 without causing the operation panel 22 to display an image which prompts a customer to set the reuse sheet. In addition, the CPU 26 determines NO in Act 12 when the copying process of all the original documents which are set in the original document tray 7 is ended, and the original document is not detected by the sensor 19. When the CPU 26 determines NO in Act 12, the process proceeds to Act 13.

The CPU 26 confirms whether a card is set in the reader-writer 23 in Act 13. The process is executed, for example, after inquiring whether the card is set in the reader-writer 23, and a response from the reader-writer 23 to the inquiry is confirmed. The reader-writer 23 includes a sensor for detecting that a card is set, and sends a detection result in the sensor to the CPU 26 as the response to the above described inquiry. In addition, the CPU 26 determines YES in Act 13 when the card (ID card which is provided by customer as described above) is detected by the reader-writer 23, and the process proceeds to Act 14.

The CPU 26 confirms the customer in Act 14. Specifically, the CPU 26 obtains identification information which is stored in the ID card from the reader-writer 23 by causing the reader-writer 23 to read the identification information. In this manner, the CPU 26 functions as an obtaining unit by executing the control program. In addition, the CPU 26 confirms whether the identification information is correlated with a person who is a target for the point service by making an inquiry to the server 200, for example.

The CPU 26 confirms whether the customer is the person who is the target for the point service in Act 15. In addition, the CPU 26 determines YES when the customer is the target for the point service, and the process proceeds to Act 16.

The CPU 26 updates a balance in a point account of the customer in Act 16. Specifically, the CPU 26 causes the reader-writer 23 to read balance information which is stored in the ID card, and obtains the balance information from the reader-writer 23. In addition, the CPU 26 generates new balance information by adding the variable P to a balance which is denoted by the balance information, and instructs the reader-writer 23 to write the new balance information to the ID card. The reader-writer 23 overwrites the above described new balance information on the ID card by receiving the instruction. The process of giving points is an example of a process which gives a user a value. In this manner, the CPU 26 functions as a processing unit by executing the control program.

The CPU 26 proceeds to Act 17 thereafter. In addition, the CPU 26 determines NO in Act 13 when the card is not detected by the reader-writer 23, and the process proceeds to Act 17 by skipping Acts 14 to 16. In addition, the CPU 26 determines NO in Act 15 when the customer is not the target for the point service, and the process proceeds to Act 17 by skipping Act 16.

The CPU 26 confirms whether there is a reserved sheet in Act 17. Specifically, the CPU 26 determines YES, i.e., that there is a reserved sheet, when Act 6 is executed even once during the current control processing, and the process proceeds to Act 18. That is, the reserved sheet is a reuse sheet which is discharged to the reservation tray 5. In addition, the CPU 26 counts the number of execution times of Act 6 as the number of reserved sheets. The CPU 26 may also confirm whether there is a reserved sheet based on an output of a sensor by providing the sensor for detecting the reserved sheet which is reserved in the reservation tray 5. In this case, counting of the number of execution times of Act 6 may be omitted.

The CPU 26 controls the transportation mechanism 15 and the image forming unit 10 so that all of the reserved sheets are discharged to the sheet discharging tray 11 in Act 18. At this time, the image forming unit 10 operates so that the reserved sheets which are transported using the transportation mechanism 15 are discharged to the sheet discharging tray 11 by causing the sheets to simply pass through. In addition, the CPU 26 ends the current control processing when all of the reserved sheets are discharged. In addition, the CPU 26 determines NO in Act 17 when Act 6 is not executed even once during the current control processing, and ends the current control processing by skipping Act 18.

As described above, when copying is performed using the multifunction printer 100, the point value P1 per one sheet is added when a reuse sheet is used, and the point value P2 per one sheet is added when a new sheet is used with respect to a balance of a point account of a customer, respectively. Accordingly, it is possible to provide a customer with a value from the use of a reuse sheet by setting the point P1 to a value which is larger than the point P2 as described above, and to motivate the customer to bring in a reuse sheet. Likewise, when the amount of reuse sheets which are brought in by customers increases, it is possible for a store to make a profit, since the use of new sheets decreases, and the store may reduce cost for purchasing new sheets.

The image forming unit 10 is a unit which forms an image using the electro-photographic method, using toner which is decolored due to the decoloring process in the decoloring unit 2. For this reason, the copied original document which is copied using the multifunction printer 100 may be used as a reuse sheet when performing new copying thereafter. Accordingly, repeated copying using the multifunction printer 100 is encouraged, and it is possible to promote a repeated use of the multifunction printer 100, and further promote repeated visits from customers.

There is no guarantee that the decoloring unit 2 may decolor all of images which are formed on a reuse sheet, and when copying is performed on a reuse sheet on which decoloring is not possible, or on which is an image insufficiently decolored, there is a concern that a customer's expectations may not be achieved. It may be the responsibility of the customer since the customer brings in the reuse sheet. However, when the responsibility of whether the reuse sheet may be decolored is with the customer, the burden on the customer is big, and there is a concern that an active use of the multifunction printer 100 may be disturbed. However, the multifunction printer 100 confirms whether the reuse sheet after being subjected to decoloring in the decoloring unit 2 is in a state in which the reuse sheet may endure the second image forming, by analyzing image data which is read using the scanner 3. In addition, in the multifunction printer 100, the reuse sheet is used in copying only when the reuse sheet is in such a state. In this manner, according to the multifunction printer 100, it is possible to output the copied original document which is suitable for an object of a customer using only a reuse sheet which is sufficiently decolored without placing responsibility on the customer of whether the reuse sheet may be decolored.

According to the embodiment, decoloring is mainly assumed as the method of decoloring. In decoloring, an image is not viewed at first sight due to an decoloring process, however, since a developer is fixed to a sheet, it is not impossible to visualize the decolored image using some process. According to the multifunction printer 100, a reuse sheet which is not used in copying, though it is subjected to the decoloring process, is returned to a customer by being discharged to the sheet discharging tray 11. For this reason, it is possible to prevent a sheet on which an image is formed with a possibility of being viewed, as described above, from being passed into another customer's hand.

The embodiment may be modified to various examples as follows.

An image which is formed on a reuse sheet may be read before being decolored by adding a transportation mechanism which sends the reuse sheet which passed through the scanner 3 to the decoloring unit 2, adding a new scanner which reads an image on the reuse sheet which is sent to the decoloring unit 2 from the reuse sheet tray 1, or the like. In addition, it is possible to store a decolored image when writing image data obtained through a reading process in a portable recording medium such as a universal serial bus (USB) memory, is added, for example.

It is also possible to configure the multifunction printer 100 by dividing the printer into a plurality of units including the decoloring unit 2, and a unit including the image forming unit 10.

The scanner 8 may be shared in reading of the original document and in reading of a reuse sheet by providing a transportation mechanism which transports a reuse sheet after being subjected to the decoloring process in the decoloring unit 2 to the scanner 8, and a transportation mechanism which transports the reuse sheet which passed through the scanner 8 to the distribution unit 4 instead of the transportation mechanism 14 and the scanner 3.

A balance of a point account may be managed in the server 200, or the like, instead of storing the balance of the point account in an ID card. In this case, the CPU 26 asks the server 200, or the like, to update a balance in Act 16.

Points may be awarded, for example, when printing data that was stored in a recording medium brought in by a customer, data stored in the multifunction printer 100, data which is provided from the server 200, or the like, in the image forming unit 10.

Values provided to a user may be substituted by various processes which are different from giving points, such as a discount for purchasing goods or a copying service which is provided using the multifunction printer 100.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:
   a decoloring unit configured to perform decoloring processing on an image formed on a sheet using decolorable material;
   an image forming unit configured to form an image on a sheet using decolorable material;
   a reuse tray configured to receive a sheet provided by a user;
   a sensor configured to provide a signal regarding whether a sheet is provided on the reuse tray; and
   a processor configured to perform processing to:
      determine whether a sheet is provided on the reuse tray based on the signal from the sensor,
      when it is determined that a sheet is provided on the reuse tray, control the decoloring unit to perform the decoloring processing on the sheet,
      determine whether the sheet meets a predetermined usability condition, when it is determined that the sheet meets the predetermined condition, control the image forming unit to form an image on the sheet, and
when the image forming unit forms an image on the sheet that is determined to meet the predetermined condition, update a rewards account of the user.

2. The apparatus according to claim 1, wherein
the processor is further configured to perform processing to obtain identification information of the user, locate the rewards account of the user using the identification information, and increase a rewards balance maintained in the account by a predetermined amount.

3. The apparatus according to claim 1, further comprising:
a reading unit configured to generate image data by reading an image which is formed on a sheet, wherein
the processor is further configured to perform processing to determine whether the sheet meets the predetermined usability condition based on image data which is obtained by the reading unit from the sheet that has been subjected to the decoloring processing in the decoloring unit.

4. The apparatus according to claim 3, wherein
the image forming unit forms the image on the sheet using image data which is obtained by the reading unit from an original sheet provided by the user.

5. The apparatus according to claim 1, further comprising:
a new sheet tray configured to receive a sheet provided by an individual different from the user; and
a new sheet sensor configured to provide a signal regarding whether a sheet is provided on the new sheet tray, wherein
the processor is further configured to perform processing to:
determine whether a sheet is provided on the new sheet tray based on the signal from the new sheet sensor, and
when it is determined that a sheet is not provided on the reuse tray or that the sheet subjected to the decoloring processing does not meet the predetermined condition, and when it is determined that a sheet is provided on the new sheet tray, control the image forming unit to form an image on the sheet provided on the new sheet tray.

6. The apparatus according to claim 5, wherein:
when the image forming unit forms an image on the sheet provided on the new sheet tray, the processor performs processing to decrease a rewards balance maintained in the account by a predetermined amount.

7. The apparatus according to claim 1, wherein the rewards account of the user is updated by adding a discount coupon for purchasing goods or services.

8. A non-transitory computer readable medium containing instructions for causing a processor in an image forming apparatus having a decoloring unit, an image forming unit, a reuse tray and a sensor configured to provide a signal regarding whether a sheet is provided on the reuse tray, to perform processing to:
determine whether a sheet is provided on the reuse tray based on the signal from the sensor;
when it is determined that a sheet is provided on the reuse tray, control the decoloring unit to perform a decoloring processing on the sheet;
determine whether the sheet meets a predetermined usability condition;
when it is determined that the sheet meets the predetermined condition, control the image forming unit to form an image on the sheet; and
when the image forming unit forms an image on the sheet that is determined to meet the predetermined condition, update a rewards account of the user.

9. The non-transitory computer readable medium according to claim 8, wherein the instructions further cause a processor to obtain identification information of the user, locate the rewards account of the user using the identification information, and increase a rewards balance maintained in the account by a predetermined amount.

10. The non-transitory computer readable medium according to claim 8, wherein
the processing to determine whether the sheet meets the predetermined usability condition is based on image data which is obtained by a reading unit of the image forming apparatus, which generates image data from the sheet that has been subjected to the decoloring processing in the decoloring unit.

11. The non-transitory computer readable medium according to claim 10, wherein
the image is formed on the sheet using image data which is obtained by the reading unit from an original sheet provided by the user.

12. The non-transitory computer readable medium according to claim 8, wherein the image forming apparatus further includes a new sheet tray and a new sheet sensor configured to provide a signal regarding whether a sheet is provided on the new sheet tray and the instructions further cause the processor to perform processing to:
determine whether a sheet is provided on the new sheet tray based on the signal from the new sheet sensor, and
when it is determined that a sheet is not provided on the reuse tray or that the sheet subjected to the decoloring processing does not meet the predetermined condition, and when it is determined that a sheet is provided on the new sheet tray, control the image forming unit to form an image on the sheet provided on the new sheet tray.

13. The non-transitory computer readable medium according to claim 12, wherein the instructions further cause the processor to:
perform processing to decrease a rewards balance maintained in the account by a predetermined amount when the image forming unit forms an image on the sheet provided on the new sheet tray.

14. The non-transitory computer readable medium according to claim 8, wherein the rewards account of the user is updated by adding a discount coupon for purchasing goods or services.

15. A method for providing image forming services to a user of an image forming apparatus having a decoloring unit, an image forming unit, a reuse tray and a sensor configured to provide a signal regarding whether a sheet is provided on the reuse tray, the method comprising the steps of:
determining whether a sheet is provided on the reuse tray based on the signal from the sensor;
when it is determined that a sheet is provided on the reuse tray, controlling the decoloring unit to perform the decoloring processing on the sheet;
determining whether the sheet meets a predetermined usability condition;
when it is determined that the sheet meets the predetermined condition, controlling the image forming unit to form an image on the sheet; and
when the image forming unit forms an image on the sheet that is determined to meet the predetermined condition, updating a rewards account of the user.

16. The method according to claim 15, further comprising the step of:
- obtaining identification information of the user;
- locating the rewards account of the user using the identification information; and
- increasing a rewards balance maintained in the account by a predetermined amount.

17. The method according to claim 15, wherein determining whether the sheet meets the predetermined usability condition is based on image data which is obtained by a reading unit of the image forming apparatus, which generates image data from the sheet that has been subjected to the decoloring processing in the decoloring unit.

18. The method according to claim 17, wherein the image forming apparatus further includes a new sheet tray and a new sheet sensor configured to provide a signal regarding whether a sheet is provided on the new sheet tray and the method further comprises the steps of:
- determining whether a sheet is provided on the new sheet tray based on the signal from a new sheet sensor; and
- when it is determined that a sheet is not provided on the reuse tray or that the sheet subjected to the decoloring processing does not meet the predetermined condition, and when it is determined that a sheet is provided on the new sheet tray, controlling the image forming unit to form an image on the sheet provided on the new sheet tray.

19. The method according to claim 18, further comprising the step of:
- when the image forming unit forms an image on the sheet provided on the new sheet tray, decreasing a rewards balance maintained in the account by a predetermined amount when the image forming unit forms an image on the sheet provided on the new sheet tray.

20. The method according to claim 15, wherein the rewards account of the user is updated by adding a discount coupon for purchasing goods or services.

* * * * *